(12) United States Patent
Karlovsky et al.

(10) Patent No.: US 9,929,438 B2
(45) Date of Patent: Mar. 27, 2018

(54) METHOD OF MANUFACTURING A LITHIUM ION BATTERY

(71) Applicant: Infineon Technologies AG, Neubiberg (DE)

(72) Inventors: Kamil Karlovsky, Bratislava (SK); Rafael Janski, Villach (AT); Michael Sorger, Villach (AT); Magdalena Forster, Villach (AT); Katharina Schmut, Egg am Faaker See (AT); Vijaye Kumar Rajaraman, Villach (AT); Rainer Leuschner, Regensburg (DE); Bernhard Goller, Villach (AT)

(73) Assignee: Infineon Technologies AG, Neubiberg (DE)

( * ) Notice: Subject to any disclaimer, the term of this patent is extended or adjusted under 35 U.S.C. 154(b) by 0 days.

(21) Appl. No.: 15/427,124

(22) Filed: Feb. 8, 2017

(65) Prior Publication Data

US 2017/0149085 A1 May 25, 2017

Related U.S. Application Data

(62) Division of application No. 14/230,086, filed on Mar. 31, 2014, now Pat. No. 9,614,256.

(51) Int. Cl.
*H01M 10/058* (2010.01)
*H01M 10/0525* (2010.01)
(Continued)

(52) U.S. Cl.
CPC ......... *H01M 10/058* (2013.01); *H01M 2/027* (2013.01); *H01M 2/0285* (2013.01); *H01M 2/0486* (2013.01); *H01M 2/08* (2013.01); *H01M 2/361* (2013.01); *H01M 4/134* (2013.01); *H01M 4/386* (2013.01); *H01M 10/0525* (2013.01);
(Continued)

(58) Field of Classification Search
None
See application file for complete search history.

(56) References Cited

U.S. PATENT DOCUMENTS

| 4,859,263 A | 8/1989 | Dziurla et al. |
| 5,864,182 A | 1/1999 | Matsuzaki |

(Continued)

FOREIGN PATENT DOCUMENTS

| CN | 1853297 A | 10/2006 |
| CN | 1860568 A | 11/2006 |

(Continued)

OTHER PUBLICATIONS

Hahn, R et al., "Silicon Integrated Micro Batteries Based on Deep Radioactive Ion Etching and Through Silicon Via Technologies", IEEE Electronic Components and Technologies Conference (ECTC) 2012, pp. 1571-1577.

*Primary Examiner* — Scott J. Chmielecki
(74) *Attorney, Agent, or Firm* — Murphy, Bilak & Homiller, PLLC

(57) ABSTRACT

A method of manufacturing a lithium ion battery includes: attaching a lid to a first main surface of a first substrate, the lid including a conductive coves element; forming a cavity between the lid and the first substrate; forming an anode comprising a component made of a semiconductor material at the first substrate; forming a cathode at the lid; and filling an electrolyte into the cavity.

20 Claims, 7 Drawing Sheets

(51) Int. Cl.
*H01M 2/04* (2006.01)
*H01M 2/08* (2006.01)
*H01M 2/02* (2006.01)
*H01M 2/36* (2006.01)
*H01M 4/134* (2010.01)
*H01M 4/38* (2006.01)

(52) U.S. Cl.
CPC .... *H01M 2220/20* (2013.01); *H01M 2220/30* (2013.01)

(56) References Cited

U.S. PATENT DOCUMENTS

| | | |
|---|---|---|
| 6,251,540 B1 | 6/2001 | Kejha |
| 6,333,565 B1 | 12/2001 | Hashimoto |
| 2003/0152815 A1 | 8/2003 | LaFollette et al. |
| 2004/0131925 A1 | 7/2004 | Jenson et al. |
| 2006/0113652 A1 | 6/2006 | Mino et al. |
| 2007/0275300 A1 | 11/2007 | Salot et al. |
| 2008/0050656 A1* | 2/2008 | Eisenbeiser ......... H01M 2/0267 429/241 |
| 2011/0183186 A1 | 7/2011 | Klootwijk et al. |
| 2012/0007749 A1 | 1/2012 | Oldknow et al. |
| 2012/0021280 A1 | 1/2012 | Katase et al. |
| 2012/0034541 A1* | 2/2012 | Muraoka ............. H01M 8/0215 429/456 |
| 2013/0183575 A1* | 7/2013 | Goto ...................... H01G 11/82 429/163 |
| 2014/0212735 A1 | 7/2014 | Li et al. |

FOREIGN PATENT DOCUMENTS

| | | |
|---|---|---|
| CN | 101471186 A | 7/2009 |
| CN | 101771168 A | 7/2010 |
| CN | 102598365 A | 7/2012 |
| WO | 2004051768 A1 | 6/2004 |

* cited by examiner

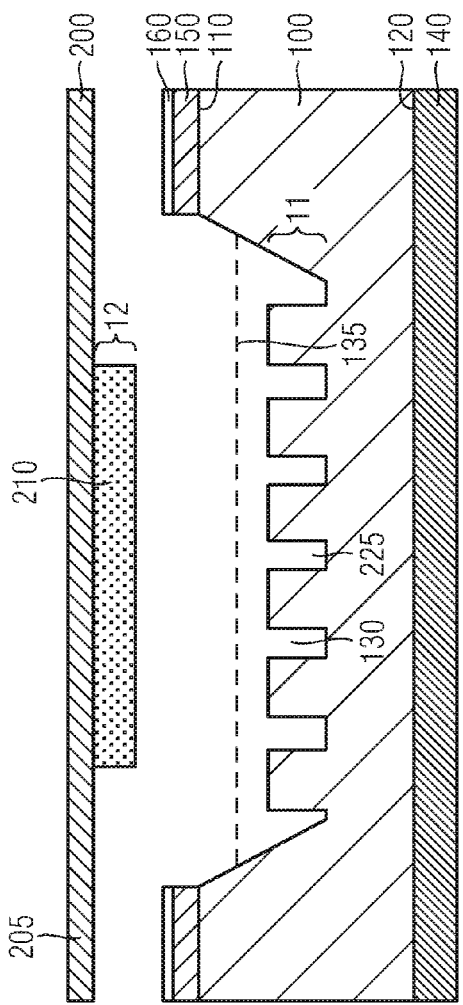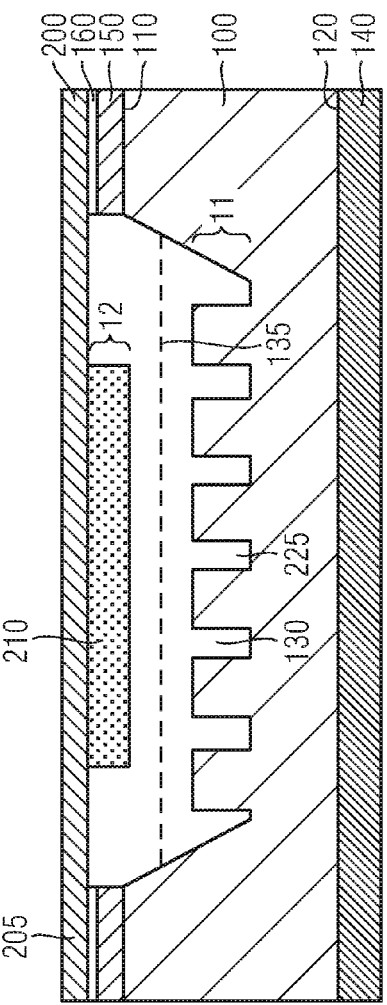
FIG 1B
FIG 1C

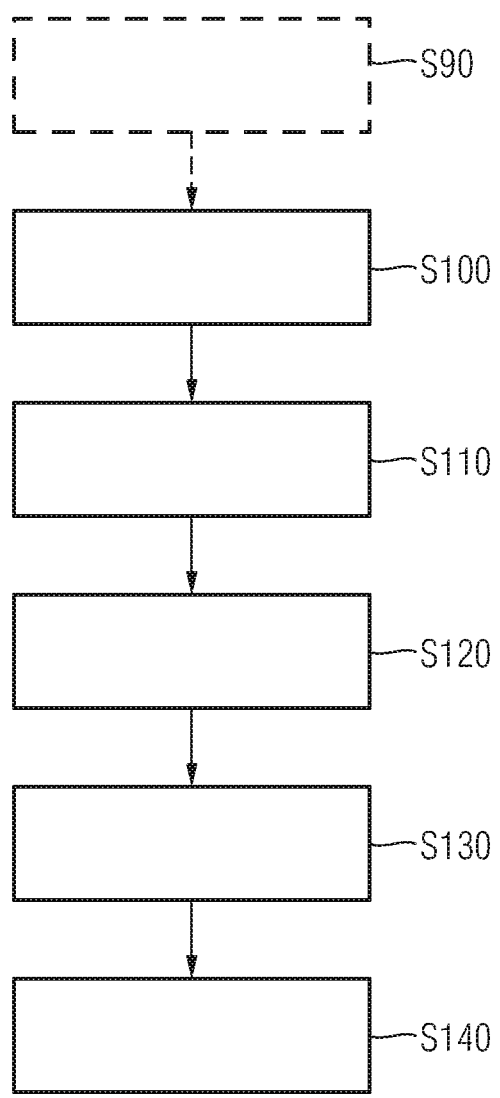

METHOD OF MANUFACTURING A LITHIUM ION BATTERY

BACKGROUND

With the increased use of portable electronic devices such as notebooks, portable telephones, cameras and others and with the increased use of current-driven automobiles, lithium ion secondary batteries with high energy density have attracted increasing attention as a power source.

Further, attempts are made for providing semiconductor devices or semiconductor-based devices having an integrated power source.

Lithium ion secondary batteries typically include a cathode comprising a lithium-containing transition metal oxide or the like, an anode typically made of a carbon material and a non-aqueous electrolyte containing a lithium salt as well as a separator situated between the anode and the cathode.

In order to meet the increasing demands on capacity and performance, new concepts for lithium batteries that can be manufactured in a simple manner are desirable.

SUMMARY

According to an embodiment, a lithium ion battery comprises a first substrate having a first main surface, a lid comprising a conductive cover element, the lid being attached to the first main surface, and a cavity formed between the first substrate and the lid. An electrolyte is disposed in the cavity. The lithium ion battery further includes an anode comprising a component made of a semiconductor material at the first substrate, and a cathode at the lid.

According to a further embodiment, an integrated circuit is formed in a first semiconductor substrate having a first main surface. The integrated circuit comprises a lithium ion battery and further includes a lid comprising a conductive cover element, the lid being attached to the first main surface, a cavity formed between the first semiconductor substrate and the lid, and an electrolyte disposed in the cavity. The lithium ion battery further includes an anode comprising a component made of a semiconductor material at the first semiconductor substrate, and a cathode of the battery at the lid.

According to a further embodiment, a method of manufacturing a lithium ion battery comprises attaching a lid to a first main surface of a first substrate, the lid comprising a conductive cover element, forming a cavity between the lid and the first substrate, forming an anode comprising a component made of a semiconductor material at the first substrate, forming a cathode at the lid, and filling an electrolyte into the cavity.

Those skilled in the art will recognize additional features and advantages upon reading the following detailed description, and upon viewing the accompanying drawings.

BRIEF DESCRIPTION OF THE DRAWINGS

The accompanying drawings are included to provide a further understanding of embodiments of the invention and are incorporated in and constitute a part of this specification. The drawings illustrate the embodiments of the present invention and together with the description serve to explain the principles. Other embodiments of the invention and many of the intended advantages will be readily appreciated, as they become better understood by reference to the following detailed description. The elements of the drawings are not necessarily to scale relative to each other. Like reference numbers designate corresponding similar parts.

FIGS. 1B to 1C illustrate steps of a method for manufacturing a battery according to an embodiment;

FIG. 3 illustrates a method of manufacturing a battery.

DETAILED DESCRIPTION

In the following detailed description reference is made to the accompanying drawings, which form a part hereof and in which are illustrated by way of illustration specific embodiments in which the invention may be practiced. In this regard, directional terminology such as "top", "bottom", "front", "back", "leading", "trailing" etc. is used with reference to the orientation of the Figures being described. Since components of embodiments of the invention can be positioned in a number of different orientations, the directional terminology is used for purposes of illustration and is in no way limiting. It is to be understood that other embodiments may be utilized and structural or logical changes may be made without departing from the scope defined by the claims.

The description of the embodiments is not limiting. In particular, elements of the embodiments described hereinafter may be combined with elements of different embodiments.

The terms "wafer", "substrate" or "semiconductor substrate" used in the following description may include any semiconductor-based structure that has a semiconductor surface. Wafer and structure are to be understood to include silicon, silicon-on-insulator (SOI), silicon-on sapphire (SOS), doped and undoped semiconductors, epitaxial layers of silicon supported by a base semiconductor foundation, and other semiconductor structures. The semiconductor need not be silicon-based. The semiconductor could as well be silicon-germanium, germanium, or gallium arsenide. According to other embodiments, silicon carbide (SiC) or gallium nitride (GaN) may form the semiconductor substrate material.

As employed in this specification, the terms "coupled" and/or "electrically coupled" are not meant to mean that the elements must be directly coupled together intervening elements may be provided between the "coupled" or "electrically coupled" elements. The term "electrically connected" intends to describe a low-ohmic electric connection between the elements electrically connected together.

The terms "lateral" and "horizontal" as used in this specification intends to describe an orientation parallel to a first surface of a semiconductor substrate or semiconductor body. This can be for instance the surface of a wafer or a die.

The term "vertical" as used in this specification intends to describe an orientation which is arranged perpendicular to the first surface of the semiconductor substrate or semiconductor body.

Figure 1A:
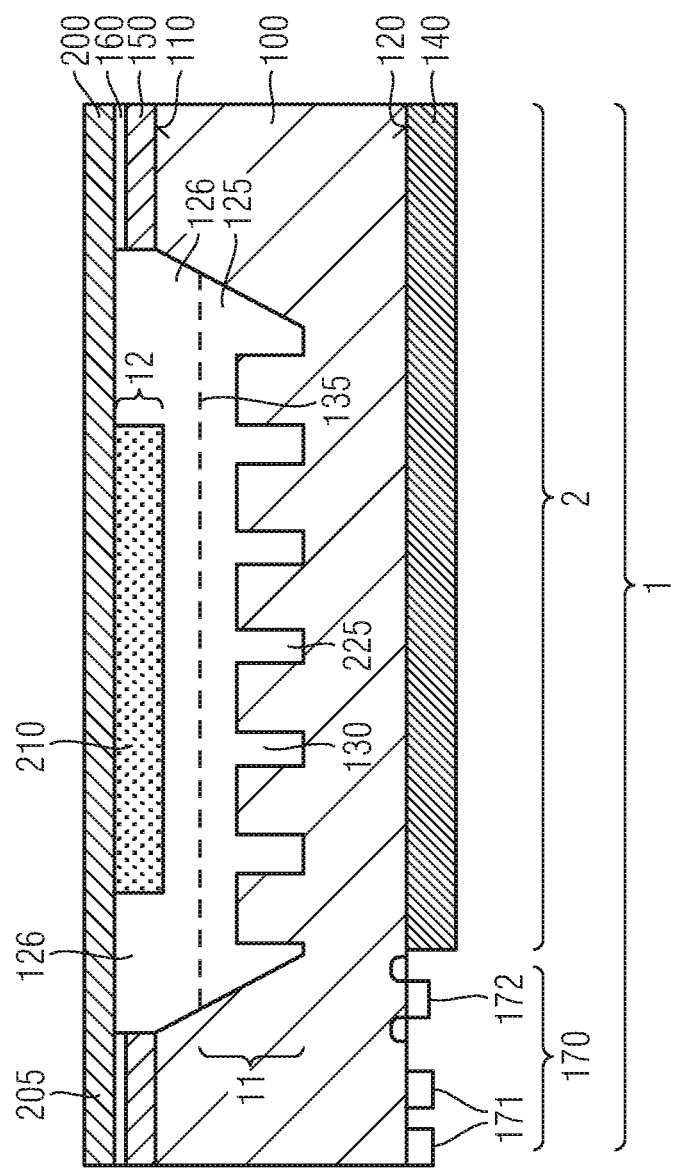
FIG. 1A illustrates a cross-sectional view of an integrated circuit according to an embodiment.

FIG. 1A shows a cross-sectional view of an integrated circuit according to an embodiment. The integrated circuit 1 illustrated in FIG. 1A comprises a battery 2 and integrated circuit elements 170. The integrated circuit elements 170 may comprise conductive lines 171 and further devices, such as active or passive semiconductor devices 172 including resistors, transistors and further elements. The integrated circuit elements 170 may additionally comprise devices for generating electrical power. Further, the integrated circuit elements 170 may comprise components for performing a special function such as sensor elements including e.g. current sensors, voltage sensors and others.

The battery 2 comprises an anode 11 and a cathode 12 as well as an electrolyte 130. The battery 2 comprises a housing including a first substrate 100 and a lid 200. A cathode material 210 may be disposed at the lid to form the cathode 12. For example, the battery may be implemented as a lithium ion battery in which the anode comprises a component made of a semiconductor material such as silicon.

The anode 11 may comprise silicon material which may be monocrystalline, polycrystalline or amorphous. The silicon material may be doped with any dopant as is conventionally used such as boron (B), arsenic (As), phosphorous (P), antimony (Sb), (Ga), indium (In) or selenium (Se). The active silicon surface of the anode 11 may be planar or patterned. For example, three-dimensional structures such as pyramids, trenches and columns may be formed in the surface of the anode 11. A thin metal layer (not shown) may be formed over the surface of the anode 11, the thin metal layer being in contact with the electrolyte 130. For example, the metal layer may comprise silver (Ag), aluminum (Al), gold (Au), palladium (Pd) or platinum (Pt). Metals forming an alloy with lithium may be used. Further examples comprise Zn, Cd, B, Ga, In, Th, C, Si, Ge, Sn, Pb, As, Sb, Bi, Se, and Te. A thickness of the metal layer 11 may be less than 100 nm and more than 1 nm. Therefore, when applying an Ag metal layer, an Ag—Li alloy will be formed at the surface of the anode 11 before charging the Si material with lithium so that the Li ions will move to the Si anode in a homogeneous manner. Further, due to the alloy layer, the formation of the native $SiO_2$ layer on the anode surface is prevented so that the transportation of ions is further enhanced. In addition, the incorporation of Li atoms into the Si anode will be accomplished in a more homogeneous manner so that the performance of the lithium ion battery will be improved. Moreover, due to the presence of the thin metal layer, the mechanical stability of the electrode during charging and discharging is enhanced.

The cathode 12 may be made of one or more cathode materials 210. As a cathode material 210, generally known electrochemical materials that are used in lithium ion batteries may be employed. Example comprise $LiCoO_2$, $LiNiO_2$, $LiNi_{1-x}Co_xO_2$, $Li(Ni_{0.85}Co_{0.1}Al_{0.05})O_2$, $Li(Ni_{0.35}Co_{0.33}Mn_{0.33})O_2$, $LiMn_2O_4$ spinel and $LiFePO_4$.

The electrolyte 130 may include electrolyte salts commonly used for lithium batteries such as e.g. $LiPF_6$, $LiBF_4$ or salts which do not include fluorine such as $LiPCl_6$, $LiClO_4$ in water-free aprotic solvents such as propylene carbonate, dimethyl carbonate or 1,2-dimethoxymethane, ethylene carbonate, diethyl carbonate and others, polymers, for example polyvinylidene fluoride (PVDF) or other polymers, solid electrolytes such as $Li_3PO_4N$ and others. For example, liquid electrolytes may be used, for example, electrolytes that do not withstand high temperatures that are higher than 80° C. As is to be clearly understood, also solid or liquid electrolytes that withstand temperatures higher than 80° C. may be used. As will become apparent from the following description, if fluorine-free salts and fluorine-free solvents are used as electrolytes, problems may be avoided when the housing of the lithium ion battery includes components made of glass.

The separator element 135 spatially and electrically separates the anode 11 and the cathode 12 from each other.

The separator element 135 should be permeable for the ions so that a conversion of the stored chemical energy into electrical energy may be accomplished. Examples of the material of the separator element 135 comprise non-woven fabric made of materials such as fiber glass, polyethylene or macroporous materials. Further, membranes which are made of microporous sheet that may comprise several layers may be employed. Further examples comprise non-woven fabric which is coated with a ceramic material. As is to be clearly understood, the separator element 135 may be dispensed with.

The battery 2 may be a rechargeable or secondary lithium ion battery. According to a further embodiment, the battery may be a primary battery which is not rechargeable. The battery 2 shown in FIG. 1 has an improved capacity for energy storage, since silicon has a large capacity of insertion of lithium. In other words, the amount of lithium atoms that can be stored or inserted in silicon is much larger than in conventional cases. Since—as will be discussed in the following—the first substrate may comprise a semiconductor material, general semiconductor processing methods may be employed. In particular, methods for manufacturing miniaturized sizes can effectively be applied for manufacturing a battery having a small size in comparison to conventional batteries. Further, components of integrated circuits may be easily integrated with the battery 2.

The battery 2 shown in FIG. 1A comprises a first substrate 100 having a first main surface 110, a lid 200 comprising a conductive cover element 205, the lid being attached to the first main surface 110 of the first substrate 100. A cavity 126 is formed between the first substrate 100 and the lid. The electrolyte 130 is disposed in the cavity 126. The anode 11 of the battery is formed at the first substrate 100 and the cathode 12 of the battery is formed at the lid 200. The lid 200 may be attached to the first substrate 100 with an insulating layer 150 disposed between the lid 200 and the first substrate 100. Thereby, the anode 11 and the cathode 12 may be insulated from each other. According to a further example, the first substrate may be an insulating substrate, including the anode that comprises a component made of silicon. A cavity 126 is disposed between the first substrate and the lid. For example, this may be accomplished by a depression 125 formed in the first substrate 100. According to a further embodiment, an intermediate member such as a further substrate portion may be disposed between the first substrate and the lid to form the cavity 126. According to an implementation, the thickness of the insulating layer 150 may be selected so that the cavity 126 is formed.

According to the embodiment shown in FIG. 1A, the lid 200 may be made of a conductive material to form the conductive cover element. The conductive cover element may be a conductive foil 205. The lid 200 of FIG. 1A comprises a conductive foil 205 and a cathode material 210. The cathode material 210 may be directly adjacent and in physical contact with the conductive foil 205. According to an embodiment, a primer layer or an adhesive layer may be disposed between the conductive foil 205 and the cathode material 210. The primer layer (not illustrated) may improve adhesion between the conductive foil 205 and the cathode material 210. The conductive foil 205 forms the top surface of the housing of the lithium ion battery 2. According to the embodiment shown in FIG. 1A, the conductive foil 205 may be a metal foil or any kind of a conductive metal compound foil, e.g. a conductive metal oxide foil. Further examples of the material of the conductive foil comprise metal alloys. In the present embodiment, the conductive foil 205 may be an aluminum foil. The cathode material 210 is in contact with the electrolyte 130 and implements a lithium source. The lid 200 is attached to the first main surface 110, wherein an insulating layer 150 is disposed between the first substrate and an adhesive foil 160 for attaching the lid to the first substrate 100. The adhesive foil may be a sealing tape comprising a heat curable polymer. For example, the sealing tape may be an epoxy resin or may comprise a composite material which is commonly used in the manufacture of Li batteries. For example, the conductive cover element may be an aluminum foil having a thickness of more than approximately 50 µm. Alternatively, the conductive cover element may also be a thin aluminum plate. According to a further embodiment, the conductive cover element may comprise copper that is coated with an aluminium layer. A cathode material layer may be disposed on the second surface of the conductive foil 205. The cathode material layer may have a lateral extension which is smaller than the lateral extension of the conductive foil 205.

In the following, a method of manufacturing an integrated circuit shown in FIG. 1A will be illustrated by referring to FIGS. 1B and 1C. A first substrate 100 which may comprise a semiconductor material or may be a semiconductor substrate, e.g. a silicon substrate, is prepared so as to establish an anode of a lithium battery. In particular, a depression 125 is formed, followed by trenches 225 so as to form a patterned surface. An insulating layer 150 having a thickness of about 100 nm to 5 µm is formed over the first surface 110 of the first substrate 100. Thereafter, a back side metallization (element) 140 may be formed on the second main surface 120 of the first substrate. The back side metallization 140 may comprise a metal layer such as aluminium, copper or a combination of these metals.

Then, an adhesive foil 160 is formed over the insulating layer 150. For example, the adhesive foil may comprise an epoxy resin or a suitable composite material including a heat curable polymer.

A cathode material layer 210 which may e.g. comprise NCA or any other cathode material as discussed above is formed on the second surface of a conductive foil 205. For example, the NCA layer 210 may be formed using a screen printing method or drop casting with subsequent pressing. A suitable electrolyte 130 is filled into the cavity 126.

The conductive foil 205 may be an aluminum foil, a copper foil or may comprise any other materials suitable for forming a conductive cover element as a component of the lid of a lithium battery. For example, the conductive foil may have a thickness of approximately 40 to 200 µm, for example, 50 to 100 µm. The metal of the conductive foil should be compatible with the lithium source. The thickness of the conductive foil 205 is selected so that this foil has the required mechanical stability. An electrolyte is filled into the cavity 126 formed between the first substrate 100 and the lid 200. The conductive foil 205 including the cathode material layer 210 is brought into contact with the adhesive foil on the insulating layer 150 that is formed over the first main surface of the first substrate 100. Then, a thermal step is performed so as to bond the conductive foil 205 to the first substrate 100, the insulating layer 150 being interposed. For example, a temperature during this thermal step may be 80 to 200° C., for example, 120 to 180° C. According to an implementation, the thermal step may be performed for a short time only that is sufficient to enable bonding. In this case, the short time will prevent the electrolyte from heating to a high temperature.

Figure 1D:
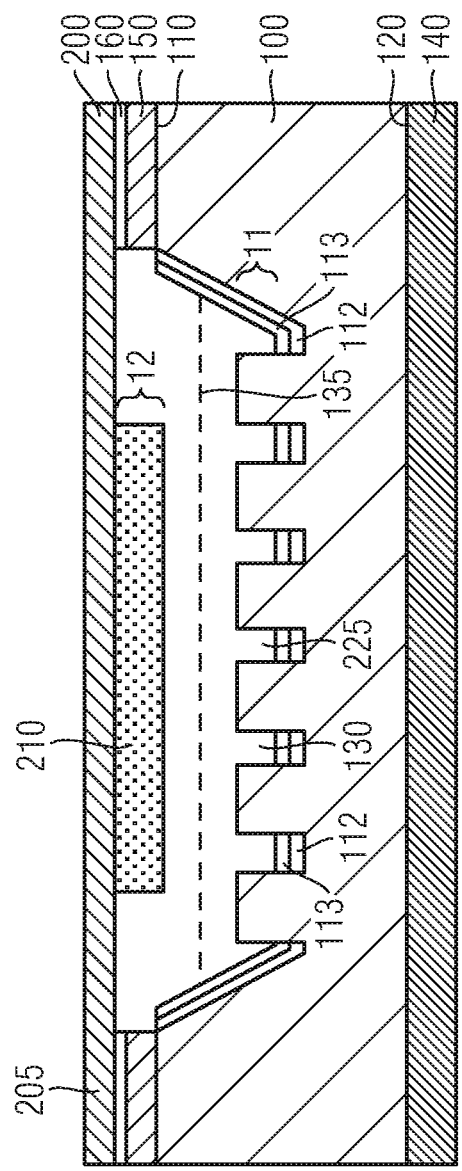
FIGS. 1D and 1E illustrate general modifications of the battery.
Figure 1E:
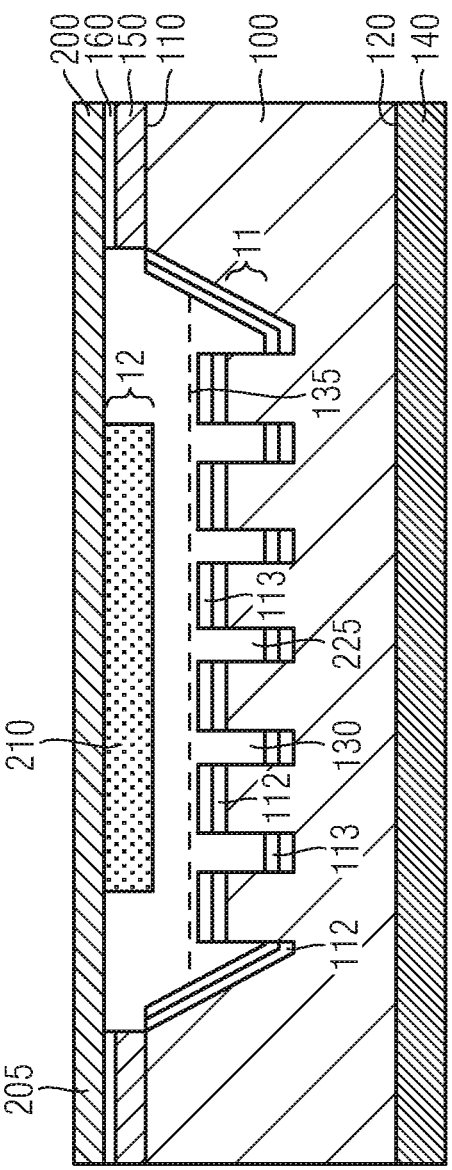

FIG. 1C shows a cross-sectional view of an example of a resulting structure. FIG. 1D shows a modification of the structure shown in FIG. 1C. As is shown, the lithium ion battery may further comprise a barrier layer (stack) that may be formed over portions of the anode. For example, the barrier layer may comprise a metal layer 112 such as TiW. Optionally, the barrier layer stack may further comprise an oxide layer 113 such as silicon oxide. For example, such an oxide layer may be formed by a PECVD (plasma enhanced chemical vapour deposition) method. The barrier layer (stack) may prevent the diffusion of lithium into the silicon at certain positions. The barrier layer (stack) may comprise a metallic layer alone or in combination with another metallic or oxide layer. As is illustrated in FIG. 1D, the barrier layer (stack) may be disposed in the trenches 225. According to the modification shown in FIG. 1E, the barrier layer (stack) may be disposed in the trenches 225 and in the silicon pillars between adjacent trenches 225. Differently stated, according to the modification shown in FIG. 1E, the barrier layer (stack) is disposed over horizontal portions of the anode 11. As is to be clearly understood, the barrier layer (stack) may be combined with any of the embodiments described herein.

Figure 2A:
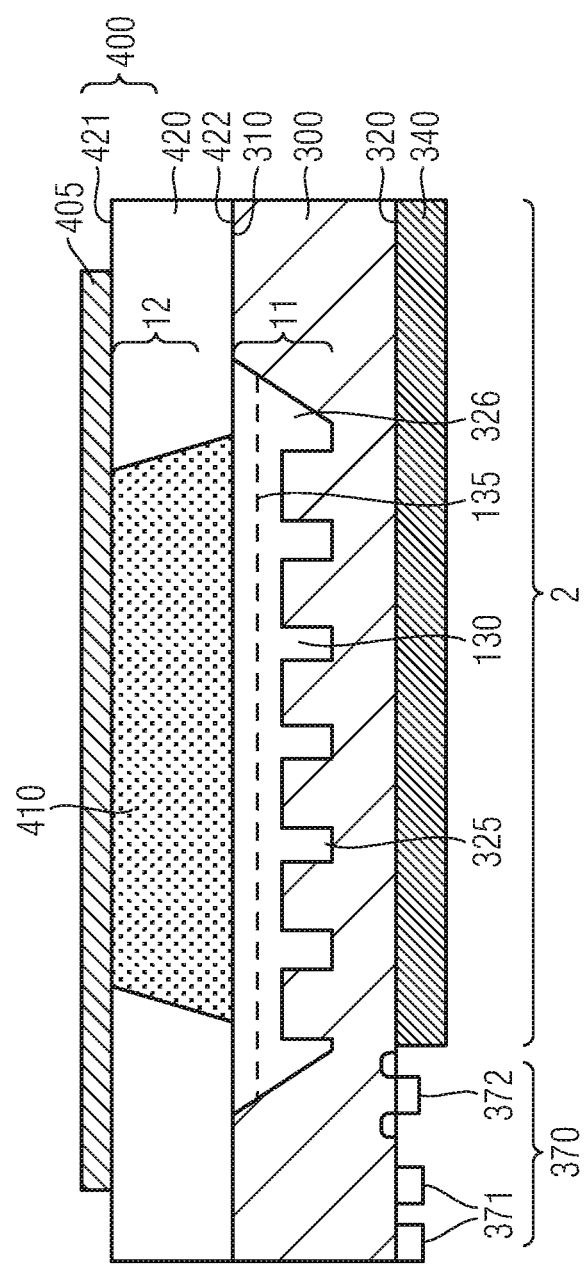
FIG. 2A shows a cross-sectional view of an integrated circuit according to a further embodiment.

FIG. 2A shows a further embodiment of an integrated circuit. Differing from the embodiment shown in FIG. 1A, the lid 400 comprises a second substrate 420 and a conductive cover element 405. The conductive cover element 405 is attached to a first main surface 421 of the second substrate 420. Further, a recess 425 is formed in the second substrate 420. Accordingly, the combined structure of the lid 400 and the first substrate includes a cavity 326. The recess 425 shown in FIG. 2A is filled with e.g. NCA as a lithium source to form the cathode 12. Further, an electrolyte 130 is disposed within the cavity 326, the electrolyte 130 being separated from the NCA 430 by means of the separator element 135. According to the embodiment shown in FIG. 2A, the conductive cover element 400 forms the top surface of the housing of the lithium battery.

The integrated circuit shown in FIG. 2A further comprises integrated circuit elements 370 such as conductive lines 371 and further devices 372 as has been explained with reference to FIG. 1A. The integrated circuit illustrated in FIG. 2A may further comprise the barrier layer (stack) that has been explained with reference to FIGS. 1D and 1F.

In the following, a method of manufacturing the integrated circuit of FIG. 2A will be explained by referring to FIGS. 2B to 2F.

Figure 2B:
FIGS. 2B to 2F illustrate steps of a method of manufacturing a battery according to an embodiment.

A second substrate 420 is patterned to include a recess 425. For example, the second substrate may be made of an insulating material such as glass for a suitable polymer. According to a further embodiment, the second substrate 420 may be made of a semiconductor material. If the second substrate 420 made of an insulating material, a further insulating layer between the first substrate 300, at which the anode is to be formed, and the second substrate 420 may be dispensed with. Accordingly, the lid 400 may be directly attached to the first substrate 300. For defining the recess 425 in the second substrate, a hard mask layer is formed on a first main surface 421 and on the second main surface 422 of the second substrate. For example, the hard mask layer may comprise any suitable hard mask material. The hard mask layer on the second main surface 422 of the second substrate may be patterned. (FIG. 2B)

Figure 2C:

Thereafter, an etching step may be performed to etch material from the second main surface 422. The recess 425 may extend from the second main surface 422 to the first main surface 421. Thereafter, the residues of the hard mask layer are removed from the first and the second surfaces 421, 422. A cross-sectional view of a resulting structure is shown in FIG. 2C.

Figure 2D:
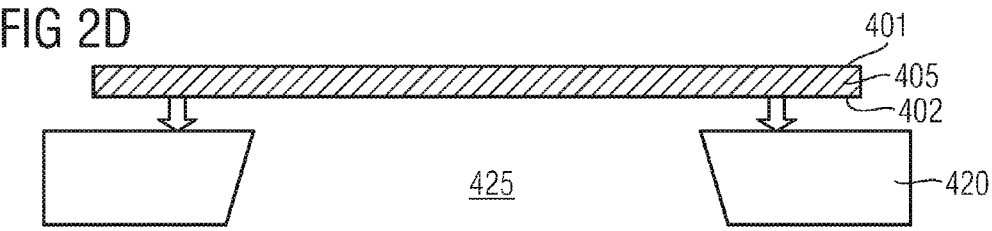

Then, a conductive cover element 405 is formed over the recess 425. For example, a metal foil or a metal plate may be attached to the first main surface 421 of the second substrate 420. According to an example, the metal foil or the metal plate may be made of aluminum. For example, the adhesive used for attaching the conductive cover element 405 to the first main surface 421 may be a UV or thermally curable adhesive. The lateral extension of the conductive cover element 405 may be smaller than the lateral extension of the second substrate 420. For example, this may be accomplished by selecting a metal foil or metal plate having a smaller lateral extension. Alternatively, the conductive cover element 405 may be applied to the second substrate 420 followed by an etching step for removing the conductive cover element from an edge portion of the second substrate 420 to uncover a portion of the first main surface 421 of the second substrate 420. FIG. 2D shows a cross-sectional view of a resulting structure.

Figure 2E:
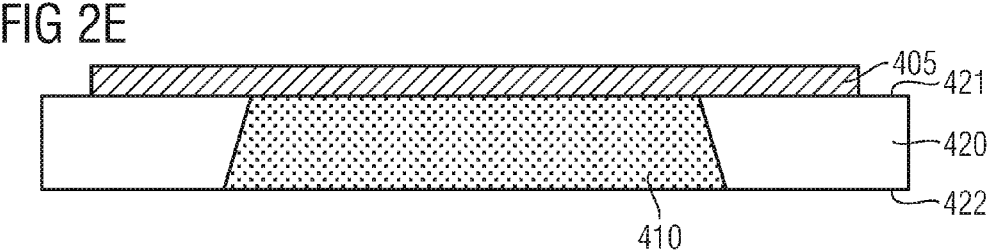
Figure 2F:
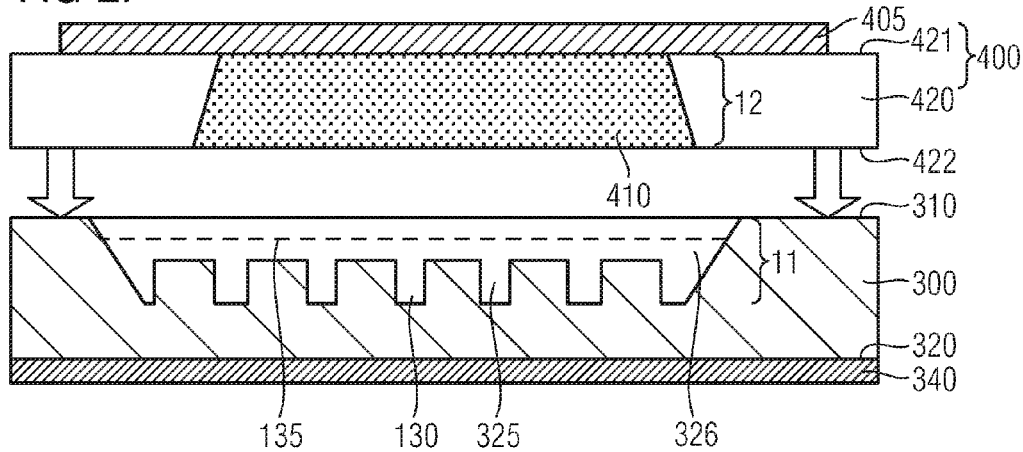

Thereafter, the recess 425 is filled with the cathode material, e.g. NCA that may, for example, be applied using a screen printing method. FIG. 2E shows an example of a resulting structure.

A first substrate 300 which may comprise a semiconductor material or may be a semiconductor substrate, e.g. a silicon substrate, is prepared so as to establish an anode of a lithium battery. In particular, a depression 325 is formed, followed by trenches 326 so as to form a patterned surface. A back side metallization (element) 340 may be formed on the second main surface 320 of the first substrate.

An electrolyte is filled into the cavity 326 formed between first substrate and the conductive cover element 405. In a next step, the second substrate 420 including the conductive cover element 405 is attached to the first substrate 300, for example, using a UV curable adhesive as indicated by the downward facing arrows in FIG. 2F. Since the conductive cover element 405 has a lateral extension smaller than a lateral extension of the second substrate 420, an edge portion of the second substrate 420 is not covered by the conductive cover element. As a result, this portion of the second substrate 420 is transparent to UV radiation so that the cavity 326 may be closed using a UV curable adhesive. Hence, the lid 400 may be bonded to the first substrate 300 without applying a high temperature, whereby the electrolyte is prevented from being degraded due to applied heat.

According to the embodiment described, the conductive cover element forms the top element of the lid and is in contact with a cathode material. Hence, a vertical connection between the anode 11 and the cathode 12 may be provided.

FIG. 3 illustrates a general method of manufacturing a lithium battery. The method comprises attaching a lid to a first main surface of a first substrate (S140), the lid comprising a conductive cover element, forming a cavity between the lid and the first substrate (S100), forming an anode comprising a component made of silicon at the first substrate (S110), forming a cathode (S120) of the battery at the lid, and filling an electrolyte into the cavity (S130). According to an embodiment, forming the lid may comprise attaching a conductive layer to a first main surface of a second substrate (S90). The exact succession of the steps may depend from the requirements when manufacturing the battery. As is to be clearly understood, the steps may be performed in a different order.

According to a further embodiment, the structure shown in FIGS. 1A and 2A may be manufactured using alternative manufacturing methods employing a higher temperature. For example, in case of no thermal budget limitation, alternative wafer bonding techniques may be used for the formation of the cavity such as anodic bonding, diffusion bonding, eutectic bonding etc. According to these methods, a stable and hermetic enclosure system between the different substrates may be formed. Due to the presence of the lid comprising a conductive cover element, a vertical and/or horizontal electrical connection to the lithium ion electrochemical system may be accomplished.

According to the embodiments described above, the integrated circuit 1 comprises a battery 2 and integrated circuit elements 17C, 370. Components of the battery and the integrated circuit elements may disposed on the same semiconductor substrate or semiconductor chip. According to further embodiments, the battery and elements of an electric circuit may be disposed on separate semiconductor substrates or chips. When the battery and the electric circuit are disposed on separate chips, the battery may be electrically coupled to the electric circuit via an interconnection.

Generally, within the context of the present specification, the electric circuit or the integrated circuit may comprise a processing device for processing data. The electric circuit or the integrated circuit may further comprise one or more display devices for displaying data. The electric circuit or the integrated circuit may further comprise a transmitter for transmitting data. The electric device or the integrated circuit may further comprise components which are configured to implement a specific electronic system. According to an embodiment, the electric device or the integrated circuit may further comprise an energy harvesting device that may deliver electrical energy to the battery 2, the energy having been generated from solar, thermal, kinetic or other kinds of energy. For example, the electric device or the integrated circuit may be a sensor such as a tire pressure sensor, wherein the electric circuit or the integrated circuit further comprises sensor circuitry and, optionally, a transmitter that transmits sensed data to an external receiver. According to another embodiment, the electric device or the integrated circuit may be an actuator, an RFID tag or a smartcard. For example, a smartcard may additionally comprise a fingerprint sensor, which may be operated using energy delivered by the battery 2.

While embodiments of the invention have been described above, it is obvious that further embodiments may be implemented. For example, further embodiments may comprise any subcombination of features recited in the claims or any subcombination of elements described in the examples given above. Accordingly, the spirit and scope of the appended claims should not be limited to the description of the embodiments contained herein.

What is claimed is:

1. A method of manufacturing a lithium ion battery, the method comprising:
   attaching a lid to a first main surface of a first substrate, the lid comprising a conductive cover element, the first substrate being a semiconductor substrate;
   forming a cavity between the lid and the first substrate;
   forming an anode comprising a component made of a semiconductor material at the first substrate;
   forming a cathode at the lid; and
   filling an electrolyte into the cavity.

2. The method of claim 1, wherein the lid is attached to the first main surface of the first substrate after filling the electrolyte into the cavity.

3. The method of claim 1, wherein forming the anode comprises patterning the first substrate to form grooves.

4. The method of claim 1, wherein forming the lid comprises providing a metal foil.

5. The method of claim 1, wherein the lid is attached to the first main surface of the first substrate by a method selected from the group consisting of thermal bonding, bonding using UV curable adhesive and anodic bonding.

6. The method of claim 1, wherein forming the lid comprises attaching a conductive cover element to a first main surface of a second substrate.

7. The method of claim 6, wherein a lateral extension of the conductive cover element is selected so that an edge portion of the second substrate is uncovered.

8. The method of claim 6, wherein the second substrate is made of an insulating material.

9. The method of claim 7, wherein the lid is attached to the first main surface of the first substrate by bonding using UV curable adhesive, and wherein UV radiation is transmitted through the uncovered edge portion of the second substrate.

10. The method of claim 6, wherein forming a cavity between the lid and the first substrate comprises forming a recess in the second substrate.

11. The method of claim 6, wherein the second substrate is a semiconductor substrate.

12. The method of claim 1, wherein forming the anode comprises forming the anode in the semiconductor substrate.

13. A method of manufacturing a lithium ion battery, the method comprising:
 attaching a lid to a first main surface of a first substrate, the lid comprising a conductive cover element;
 forming a cavity between the lid and the first substrate;
 forming an anode comprising a component made of a semiconductor material at the first substrate;
 forming a cathode at the lid; and
 filling an electrolyte into the cavity,
 wherein forming the lid comprises attaching a conductive cover element to a first main surface of a second substrate and the second substrate is a semiconductor substrate.

14. The method of claim 13, wherein the lid is attached to the first main surface of the first substrate after filling the electrolyte into the cavity.

15. The method of claim 13, wherein forming the anode comprises patterning the first substrate to form grooves.

16. The method of claim 13, wherein forming the lid comprises providing a metal foil.

17. The method of claim 13, wherein the lid is attached to the first main surface of the first substrate by a method selected from the group consisting of thermal bonding, bonding using UV curable adhesive and anodic bonding.

18. A method of manufacturing a lithium ion battery, the method comprising:
 attaching a lid to a first main surface of a first substrate, the lid comprising a conductive cover element;
 forming a cavity between the lid and the first substrate;
 forming an anode comprising a component made of a semiconductor material at the first substrate, wherein forming the anode comprises patterning the first substrate to form grooves;
 forming a cathode at the lid; and
 filling an electrolyte into the cavity.

19. The method of claim 18, wherein the lid is attached to the first main surface of the first substrate after filling the electrolyte into the cavity.

20. The method of claim 18, wherein forming the lid comprises providing a metal foil.

* * * * *

UNITED STATES PATENT AND TRADEMARK OFFICE
CERTIFICATE OF CORRECTION

PATENT NO. : 9,929,438 B2
APPLICATION NO. : 15/427124
DATED : March 27, 2018
INVENTOR(S) : K. Karlovsky et al.

Page 1 of 1

It is certified that error appears in the above-identified patent and that said Letters Patent is hereby corrected as shown below:

On the Title Page

Abstract (Line 3), please change "coves" to -- cover --.

Signed and Sealed this
Twenty-ninth Day of May, 2018

Andrei Iancu
*Director of the United States Patent and Trademark Office*